United States Patent [19]

Bordes

[11] 4,347,920
[45] Sep. 7, 1982

[54] FREEWHEEL WITH LATERAL RETURN

[75] Inventor: Alain Bordes, Trappes, France

[73] Assignee: SKF Compagnie d'Applications Mecaniques, Clamart, France

[21] Appl. No.: 147,650

[22] Filed: May 7, 1980

[30] Foreign Application Priority Data

May 10, 1979 [FR] France .................................. 79 11918

[51] Int. Cl.³ ............................................. F16D 41/07
[52] U.S. Cl. .................................... 192/41 A; 192/45.1
[58] Field of Search ............................. 192/41 A, 45.1; 188/82.8

[56] References Cited

U.S. PATENT DOCUMENTS

| 2,753,027 | 7/1956 | Troendly et al. | 192/45.1 |
| 2,824,635 | 2/1958 | Troendly et al. | 192/45.1 |
| 3,207,278 | 9/1065 | Titt | 192/45.1 |
| 3,219,163 | 11/1965 | Zlotek | 192/45.1 |
| 3,363,733 | 1/1968 | Titt | 192/45.1 |

Primary Examiner—Allan D. Herrmann
Attorney, Agent, or Firm—Beveridge, DeGrandi & Kline

[57] ABSTRACT

Cam-type freewheel, characterized by the fact that the cage is made in one piece in moulded material with roughly rectangular recesses taking the cams, and by the fact that the continuous strip spring is placed round the periphery of the cage and comprises, at right angles to each recess, one or more elastic tabs entering the recess and bearing against the base of the cam in the proximity of the inner bush and so exerting on it a roughly tangential and preferably slightly outwardly oblique lateral thrust, with the angular and axial immobility of the spring with respect to the cage being provided by studs or lugs carried by one of these components and entering openings made in the other.

7 Claims, 6 Drawing Figures

FREEWHEEL WITH LATERAL RETURN

The invention deals with freewheels or unidirectional (overrunning) clutches containing jamming elements profiled in a cam shape and placed between the bore of an outer bush of revolution and the outer surface of an inner bush or a shaft which is concentric with this bore.

The various freewheel units of this type differ from each other primarily by the cage which must perform a number of functions: keeping the cams to a regular peripheral spacing, keeping the cams oriented with their generating lines in the axial direction, exerting an elastic return torque individually on each cam and finally often making sure the cams stay in the cage when the equipped cage is handled before being inserted between the outer bush and the shaft. For this purpose the cage consists of a rigid structural component and elastic components sometimes combined in a single elastic component in a continuous strip. However, in order to manage to provide the whole range of the above functions it becomes necessary for both components, and notably for the elastic element, to require great shape complexity allied with extreme accuracy. The result of this is that freewheels of this type are generally relatively expensive and can only be used in practice for special large-scale applications.

The purpose of the invention is to eliminate the above drawbacks by making a cam-type freewheel in which the cage and the single elastic component are very simple to manufacture and possess great tolerance from the precision engineering standpoint.

The invention consists of a freewheel of the above type comprising a structural component or cage proper and an elastic component in the form of a continuous strip or spring, in making the cage in the form of a single-piece moulding, preferably in plastics material with recesses or holes for each of the cams, whilst the spring is placed round the periphery of this cage and bears elastic fingers which enter each of the recesses and elastically bears on the corresponding cam along a generating line near to the shaft, whilst a generating line near to the periphery, and on the opposite side to the previous one comes up against the opposite inside face of the recess, with the spring thus exerting on the cam a roughly tangential lateral force which works with the reaction of the recess wall to set up the required return torque, with one of the two components, cage or spring, possessing studs which work with openings in the other component to ensure relative angular immobility between these two components, whilst each cam is restrained on the inside of the aforesaid elastic finger and the above-mentioned recess wall, and the spring and cam are restrained on the outer side by a sleeve placed round the periphery of the assembly.

This sleeve can be formed by a crimped sleeve, like needle bearing needle retainer sleeves, and thus form the outer bush of the freewheel, or can, in another version, be formed by a temporary sleeve allowing the cage to be handled until it is assembled in the actual outer bush by being slid axially from this temporary sleeve.

The angular location studs can be moulded on the edge of the cage to mate with openings cut out in the spring, or in another version they can be formed by fingers on the spring bent inside and going into additional openings in the cage. In the latter case the ends of these fingers can be bent tangentially so as to hook under the corresponding part of the cage and assure or help in retention of the spring.

Other features of the invention will be revealed in the description to follow of two embodiments taken as examples and shown in the appended drawings and in which.

Figure 1:
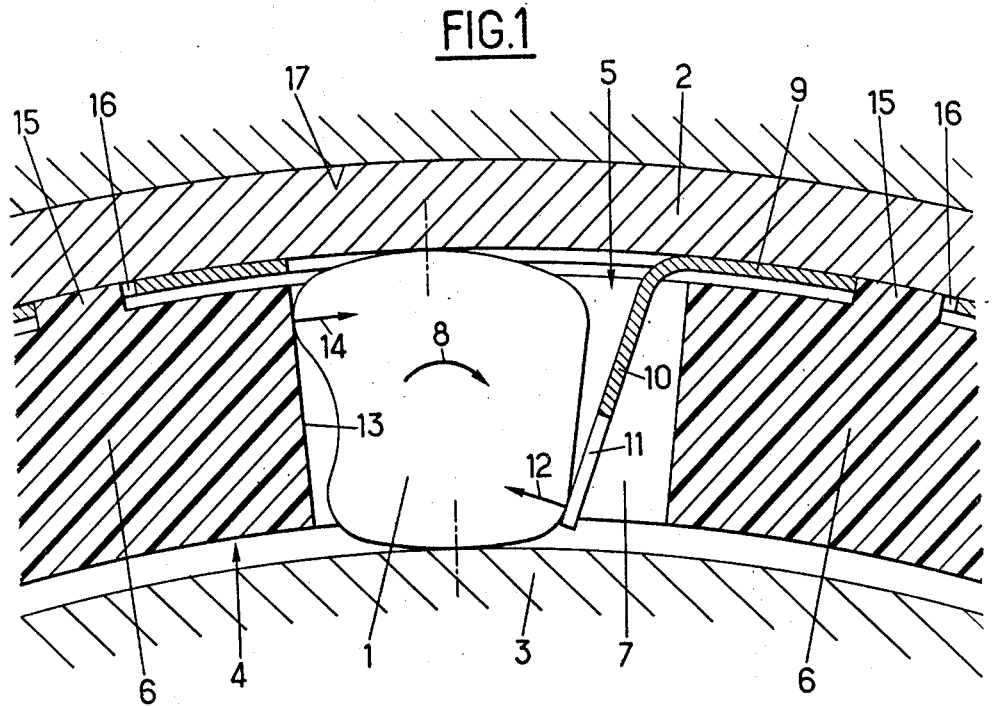
FIG. 1 is a large-scale part section view of a first embodiment in its operational position.

As can be seen in FIG. 1, the freewheel according to the invention comprises, as is commonly the case, a number of profiled cams 1 placed so that they can be jammed between an outer bush 2 and an inner bush 3 or a shaft.

In conformance with the invention the cage 4 designed to maintain the regular spacing between the various cams 1 and their axial orientation is made in one piece in moulded material, preferably in filled plastics material, and it comprises recesses 5 in the shape of a rectangular window bounding between them two successive solid bars 6 connected together at their ends by continuous annular side plates or flanges 7.

Furthermore, in order to ensure that jamming is initiated, i.e., in order to exert a rotational torque on each cam 1 in the direction shown by the arrow 8, a single spring 9 is provided which consists of one or more flexible tabs 10 at the position of each recess 5 which have two separate ends 11 each bearing on the ends of a cam 1 profile generating line near the shaft 3 so as to exert on it an elastic force represented by the arrow 12. The cam 1 also comes into contact, through another generating line near the outer bush 2 and located opposite the tabs 11, with the corresponding end face of the recess 5, which face thus exerts a reaction shown by arrow 14. It is the combination of the two forces 12 and 14 which sets up the elastic return torque 8 in conjunction with the jamming forces exerted between the cam and the outer bush 2 and the inner bush 3.

As shown in the figures, face 13 is roughly radial, so that force 14 is tangential, disregarding friction, and furthermore force 12 is also roughly tangential but preferably slightly oblique towards the outside as shown.

Figure 3:
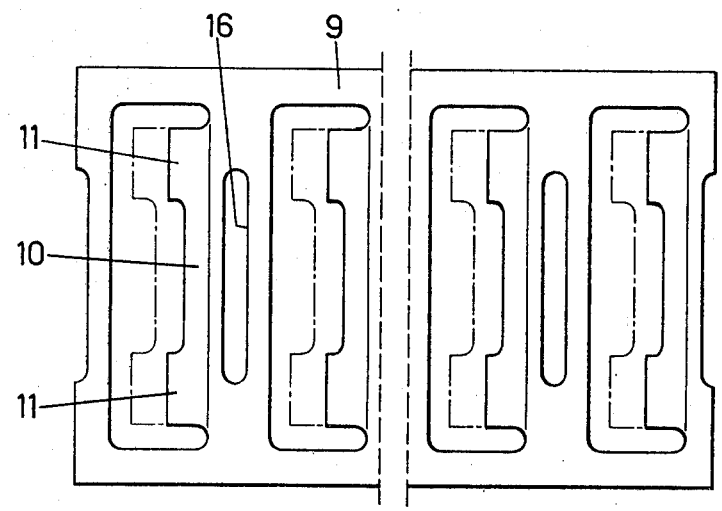
FIG. 3 shows a smaller scale plan view of the corresponding spring.

This single spring 9 is made in a continuous strip by a known method by blanking, bending and heat treatment followed by cutting to length at the time of use. FIG. 3 shows the shape detail of this spring, with the broken line corresponding to the flat blanked shape before bending. It is therefore necessary to both make sure this spring is fixed axially and tangentially to the cage 4 and retain this spring on the periphery of the cage 4 round which it is placed.

The first two functions are provided by studs or lugs 15 cast directly on the edge of the cage 4 and practically coming into contact with the internal bore of the outer bush 2; these studs work with suitable openings 16 cut out of the spring 9 as shown in FIG. 1. A large clearance of almost twice the thickness of the spring 9 can be arranged between the edge of the cage 4 and the internal bore of the outer bush 2 which makes it possible to do away with extreme precision when blanking it. Since the spring is rectangular in shape at rest, its stiffness tends to position it at the outer periphery of this clearance, i.e. in contact with the outer bush 2, but it automatically fits inside this clearance in accordance with the tolerances of the openings 16 and the studs 15.

Figure 2:
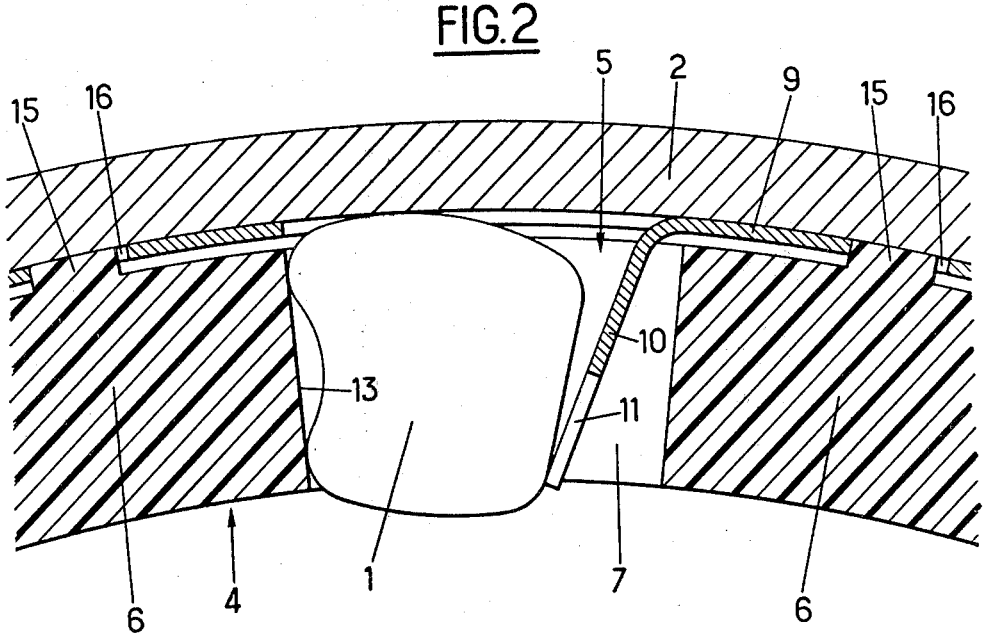
FIG. 2 is a corresponding view of the assembly to be supplied before fitting.

In order to retain this spring round this periphery, and also to restrain the cams 1 in the recesses 5, it is planned, according to the invention and as shown in FIG. 2, to supply the assembly of the cage 4, its spring 9 and the cams 1 fitted inside a thin heat-treated steel sleeve with edges extending radially towards the centre of the type used for needle bearings with needle retainers. This sleeve then itself forms the outer bush (2) and, being thin, it is itself fitted into the bore 17 of the part in which the freewheel unit is to be installed.

The assembly is therefore supplied in the form shown in FIG. 2, enclosed in its outer sleeve 2, but, on the other hand, it is easy to see that on the shaft side it is not necessary to provide an inner bush, since the oblique outward direction of forces 12 and 14 together, mentioned above, contributes to the retention of the cams 1 in their separate recesses.

So the assembly is implemented very cheaply, since the simple shapes and the low precision required in the moulding 4 and in the blanked/bent/heat-treated, by a continuous process, part 9 make these components relatively inexpensive; moreover the sleeve 2 is a relatively inexpensive standard part which makes it possible to do without the requirements of great hardness and a polished surface finish on the bore 17, as would be the case if there were not this sleeve.

In another version, it is also possible to replace the heat-treated sleeve with retaining edges by a simple tubular envelope in any material designed only to facilitate handling of the assembly before it is installed. In this case the bore forming the outer jamming race is directly machined in the part, and the whole cage, cam and spring unit is transferred into its housing by being slid axially out of its temporary shipping envelope, which is then recovered or discarded.

Figure 6:
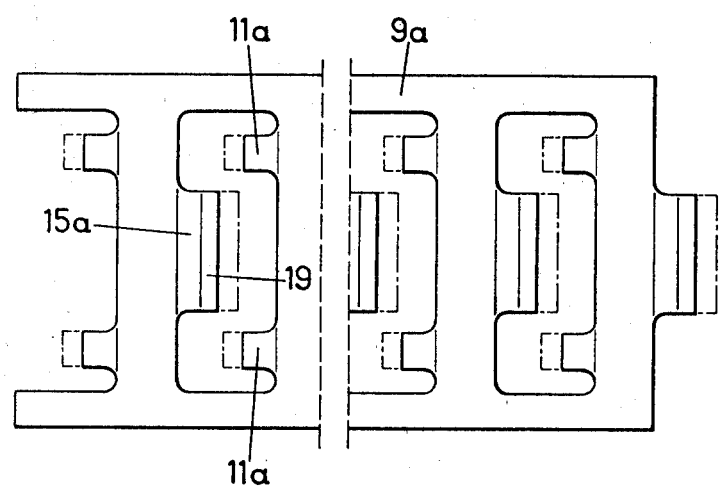
FIGS. 4, 5 and 6 are the views corresponding to FIGS. 1, 2 and 3 in the case of a second embodiment.
Figure 4:
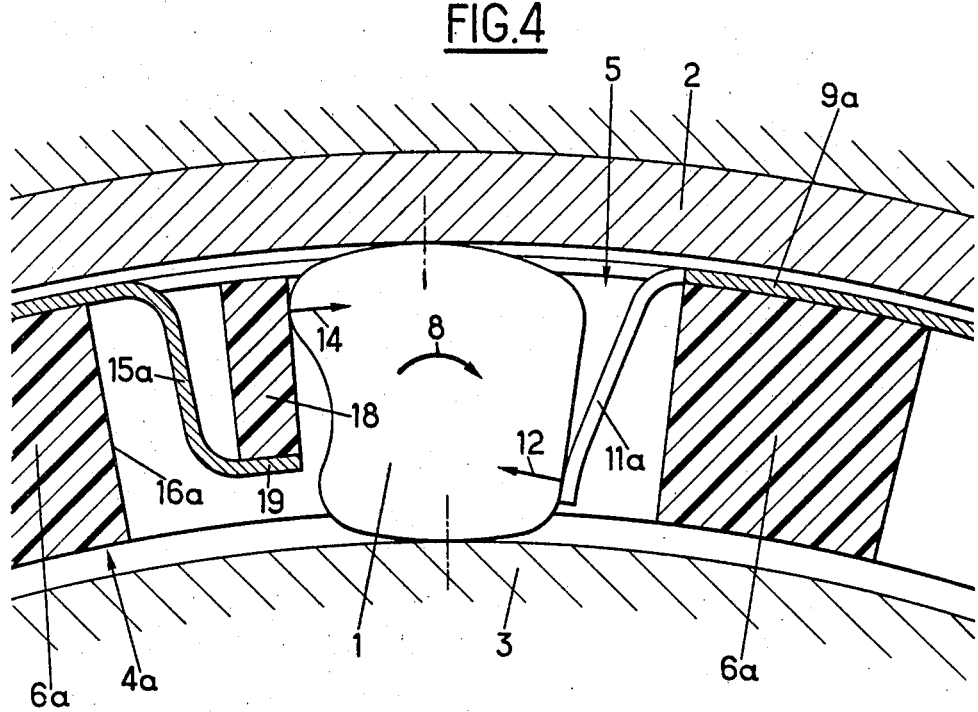
Figure 5:
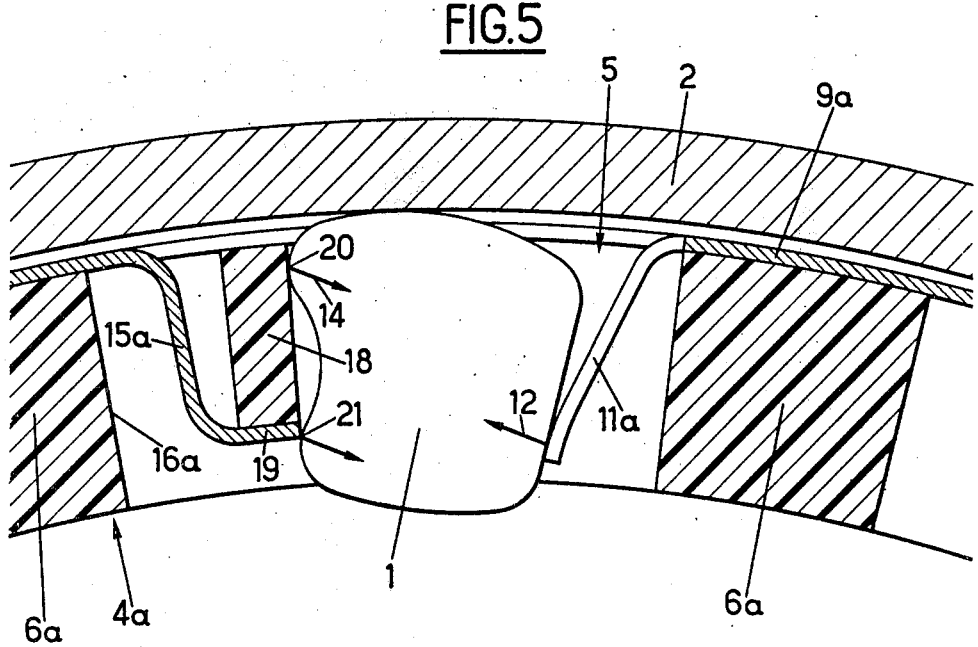

All the above is also valid for the variant in FIGS. 4 to 6, apart from the fact that the lugs 15a form a piece with the spring 9a and the openings 16a are made in the cage 4. The previous bars 6 are then split into two bars 6a and 18 which provide the openings 5 and 16a respectively between them. It is then advantageous to fit each stud or lug 15a with an end 19 bent tangentially so that it hooks under each bar 18 which is cut back from its base for this purpose. Hooking the spring 9 like this means that it is held onto the periphery of the cage 4 in such a fashion that the outer bush only has to retain the cams 1.

As above it is possible to use, for this sleeve 2, a heat-treated sleeve acting as the outer bush and remaining in position on installation, or a temporary transport sleeve. In the latter case it is important to point out that, in the shipping position shown in FIG. 5, the cam 1 with its two bosses comes into contact with the cage 4 or the edge 19 along two contact profile-generating lines 20 and 21, and that the oblique force 12 explained previously runs roughly between these two generating lines so that it is possible to remove the cage, cams and spring assembly from its shipping sleeve and to handle it before inserting it into its bore; in this case the spring 9a is restrained by the edges 19 as explained and the cams are adequately held by friction forces, at least provided rough handling, impacts or dropping are avoided.

I claim:

1. A freewheel which is operable between the surfaces of revolution of an outer bush and an inner bush or shaft, said freewheel comprising a plurality of cams for engaging said surfaces of revolution, a cage formed of a single piece of moulded material which has a plurality of roughly rectangular recesses for the cams, said cams being located in said recesses, a continuous strip spring located around the periphery of said cage and being operable as an elastic return means for said cams, said spring having elastic tabs which enter the cage recesses at right angles thereto and bear against the base of the respective cam near the inner bush to exert on it a roughtly tangential thrust, means for fixing said spring member angularly and axially with respect to the cage member, said fixing means including projections on one member which extend into openings on the other member.

2. A freewheel according to claim 1 wherein said projections are studs located on the periphery of the cage, and the openings are cut in the spring.

3. A freewheel according to claim 1 wherein said projections are lugs which are blanked in and bent inwardly from the spring, and the openings are moulded in the cage.

4. A freewheel according to claim 3 wherein each of the lugs has a tangentially bent edge which hooks under the cage in the area between the recesses and the openings.

5. A freewheel according to any one of the claims 1-4 including an outer bush which has its edges extending radially toward the centre, said cage, spring and cams being inside the outer bush, said outer bush being formed of a heat-treated thin steel sleeve.

6. A freewheel according to any one of claims 1-4 having a temporary shipping sleeve, said cage, spring and cams being supplied inside the temporary shipping sleeve and being transferable therefrom as an assembly during installation of the freewheel.

7. A freewheel according to any one of claims 1-4 wherein the spring is oriented to exert said roughly tangential thrust in an obliquely outward direction.

* * * * *